United States Patent
Buck et al.

(10) Patent No.: US 8,688,458 B2
(45) Date of Patent: Apr. 1, 2014

(54) ACTUATOR CONTROL OF ADJUSTABLE ELEMENTS BY SPEECH LOCALIZATION IN A VEHICLE

(75) Inventors: Markus Buck, Biberach (DE); Gerhard Uwe Schmidt, Ulm (DE); Tim Haulick, Blaubeuren (DE)

(73) Assignees: Harman International Industries, Incorporated, Stamford, CT (US); Harman Becker Automotive Systems GmbH, Stamford, CT (US)

( * ) Notice: Subject to any disclaimer, the term of this patent is extended or adjusted under 35 U.S.C. 154(b) by 1760 days.

(21) Appl. No.: 11/362,286

(22) Filed: Feb. 23, 2006

(65) Prior Publication Data

US 2007/0038444 A1 Feb. 15, 2007

(30) Foreign Application Priority Data

Feb. 23, 2005 (EP) .................................. 05003923

(51) Int. Cl.
*G10L 15/22* (2006.01)

(52) U.S. Cl.
USPC ............................. 704/275; 704/231; 381/92

(58) Field of Classification Search
USPC .................. 704/236, 270, 275, 231; 348/169; 381/92
IPC .................................. G10L 15/22; H04R 3/005
See application file for complete search history.

(56) References Cited

U.S. PATENT DOCUMENTS

| | | | |
|---|---|---|---|
| 6,005,610 A * | 12/1999 | Pingali | 348/169 |
| 6,198,693 B1 * | 3/2001 | Marash | 367/125 |
| 6,355,920 B1 * | 3/2002 | Schofield et al. | 250/206 |
| 6,593,956 B1 * | 7/2003 | Potts et al. | 348/14.09 |
| 6,731,334 B1 | 5/2004 | Maeng et al. | |
| 6,889,189 B2 * | 5/2005 | Boman et al. | 704/270 |
| 6,970,796 B2 * | 11/2005 | Tashev | 702/94 |
| 7,072,750 B2 * | 7/2006 | Pi et al. | 701/36 |
| 7,130,797 B2 * | 10/2006 | Beaucoup et al. | 704/233 |
| 7,680,286 B2 * | 3/2010 | Hashimoto et al. | 381/86 |
| 7,680,287 B2 * | 3/2010 | Amada et al. | 381/92 |
| 7,720,679 B2 * | 5/2010 | Ichikawa et al. | 704/233 |
| 8,194,500 B2 * | 6/2012 | Wolff et al. | 367/125 |
| 2003/0122652 A1 * | 7/2003 | Himmelstein | 340/5.81 |
| 2004/0143440 A1 | 7/2004 | Prasad et al. | |
| 2005/0049864 A1 * | 3/2005 | Kaltenmeier et al. | 704/233 |
| 2006/0074686 A1 * | 4/2006 | Vignoli | 704/275 |
| 2007/0183618 A1 * | 8/2007 | Ishii et al. | 381/387 |
| 2008/0154613 A1 * | 6/2008 | Haulick et al. | 704/275 |
| 2008/0262849 A1 * | 10/2008 | Buck et al. | 704/275 |
| 2008/0285772 A1 * | 11/2008 | Haulick et al. | 381/92 |
| 2009/0018828 A1 * | 1/2009 | Nakadai et al. | 704/234 |
| 2009/0076815 A1 * | 3/2009 | Ichikawa et al. | 704/233 |
| 2009/0089065 A1 * | 4/2009 | Buck et al. | 704/275 |
| 2009/0125311 A1 * | 5/2009 | Haulick et al. | 704/275 |
| 2012/0294118 A1 * | 11/2012 | Haulick et al. | 367/121 |

FOREIGN PATENT DOCUMENTS

| | | | |
|---|---|---|---|
| EP | 0 472 356 A1 | 2/1992 | |
| EP | 0 624 046 A1 | 11/1994 | |
| EP | 1 085 781 A2 | 3/2001 | |
| EP | 1 493 993 A1 | 1/2005 | |

* cited by examiner

*Primary Examiner* — Martin Lerner

(74) *Attorney, Agent, or Firm* — Alleman Hall McCoy Russell & Tuttle LLP

(57) ABSTRACT

An approach for adjusting an adjustable element, such as a mirror, head rest, steering wheel, heating/air condition blower, associated with a vehicle by determining the position of a speaker in the vehicle.

23 Claims, 2 Drawing Sheets

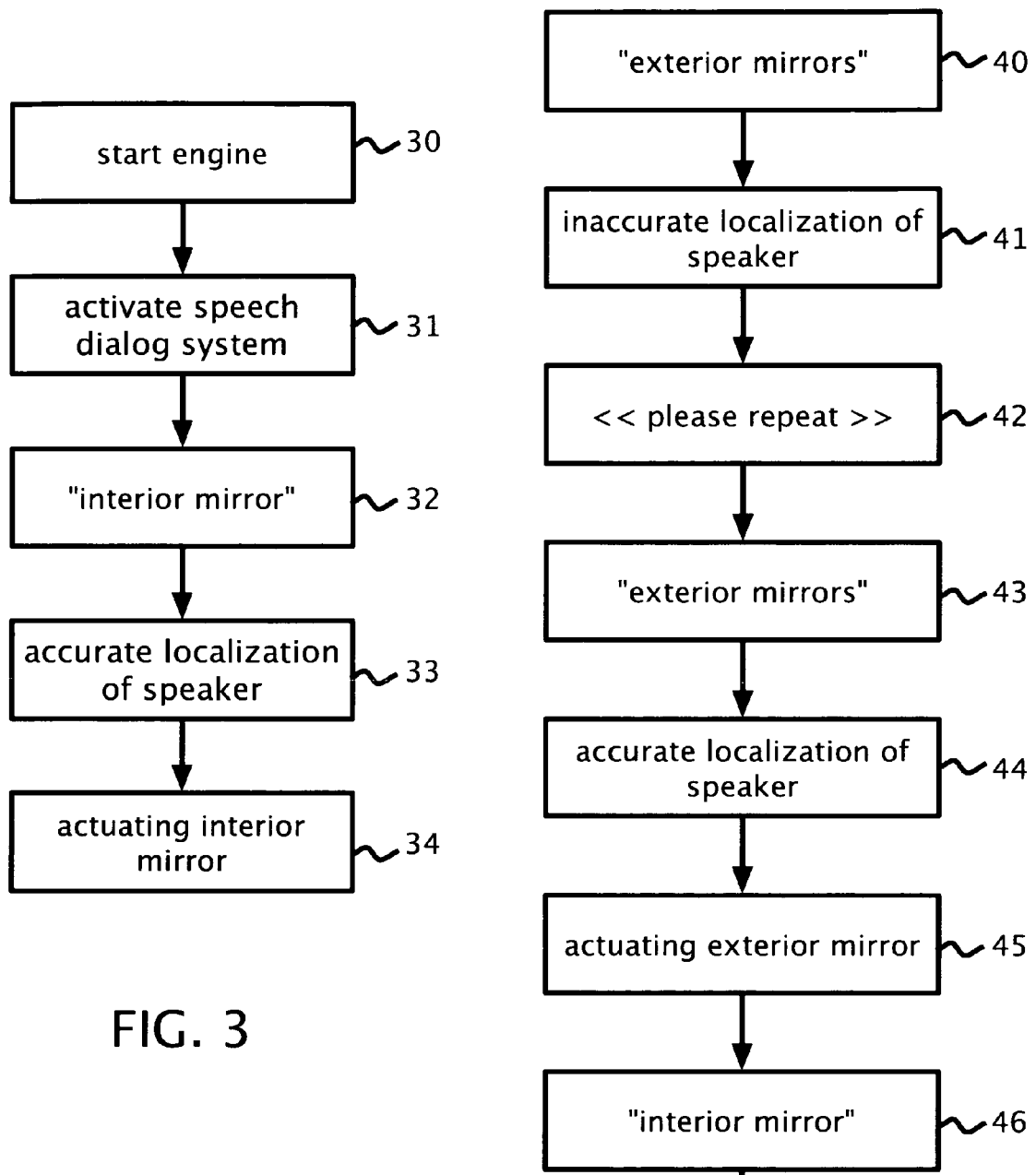

ACTUATOR CONTROL OF ADJUSTABLE ELEMENTS BY SPEECH LOCALIZATION IN A VEHICLE

PRIORITY CLAIM

This application claims the benefit of priority from European Patent Application No. EP 05 00 3923, filed Feb. 23, 2005, which is incorporated by reference herein in its entirety.

BACKGROUND OF THE INVENTION

1. Technical Field

The present invention relates to the automatic control of adjustable elements. In particular, adjustable elements associated with a vehicle may be automatically adjusted based on the position of a driver or passenger in the vehicle, where the position of the driver or passenger may be determined from differences in the time of arrival of sounds uttered by the driver or passenger at individual microphones within an array of microphones.

2. Related Art

The occupants of vehicles, particularly those driving or piloting a vehicle, are often required to operate and adjust various apparatus and control elements associated with the vehicle. This is true regardless of the type of vehicle, be it a car, a truck, a boat, a plane, or some other type of vehicle. The apparatus and elements that must be operated and adjusted may be associated with the vehicle's interior cabin space, or the exterior of the vehicle. For example, some of the apparatus and elements that may be manipulated and adjusted on an automobile include the rear view and side view mirrors; heating and air conditioning controls; sound system controls; display devices such a navigational systems, and the like.

Such adjustable elements may be manipulated manually, mechanically, electrically, pneumatically, or through some other actuating mechanism. For example, a rear view mirror on an automobile may be manipulated manually. Car windows may be operated mechanically by a hand crank, or electrically by a small electric motor. Power door locks may be operated electrically or pneumatically. Even when various adjustable elements are not actuated by hand, adjusting the elements may nonetheless require activating a switch or button or knob or some other interface device to initiate action desired. When the occupant of the vehicle desiring to make such an adjustment is the driver or pilot of the vehicle, manually operating an interface device can be distracting and even dangerous. Nonetheless, making such adjustments during the course of operating a vehicle is often required. For example, a driver may wish to adjust the position of the driver's seat to provide greater comfort or to improve visibility. If driver changes his or her seating position, it may be necessary to adjust the viewing angle of the rearview and side view mirrors. Climate control settings may need adjusting, and so forth. Such adjustments intermittently require the driver's attention and divert the driver's attention from the road ahead.

Consequently, there is a need for safer and easier adjustment mechanism for adjusting adjustable elements associated with vehicles. In particular, improved methods are desired for adjusting those elements of a vehicle that are vital for the safe operation of the vehicle.

SUMMARY

This invention provides a system for adjusting an adjustable element associated with a vehicle. The adjustable element may be an interior mirror; an exterior mirror; a head rest; an arm rest; a steering wheel/steering column; a heating/air conditioning blower; a display, an on-board navigation system, a loudspeaker, or some other element associated with a vehicle. The system may include an actuator adapted to move the adjustable element. An array of microphones detects speech uttered by a first speaker and generates speech signals corresponding to the detected speech. A localization detector is configured to determine the position of the first speaker based on the speech signals, and is configured to output a localization signal representative of the determined position of the first speaker. A controller may be provided for controlling the actuator associated with the adjustable element. The controller may be adapted to receive the localization signal and to control the actuator to adjust the position of the adjustable element on the basis of the localization signal, and thus the position of the first speaker.

The system may also include a speech recognition or speech dialog system. The speech recognition system may be configured to receive the speech signals from the microphones and output a command signal based on the content of the speech signals. In this case the controller may be configured to receive the command signal and control the actuator in response to the command signal.

A beamformer may also be provided. The beamformer may be configured to receive both the speech signals and the localization signal, and to generate beamformed signals from the received voice signals. The beamformed signals may exhibit a preference for voice signals originating from a direction determined by the localization signal. The speech recognition system may be configured to receive the beamformed signals and output the command signal to the controller based on the beamformed signals.

The localization detector may be further configured to calculate a confidence value relating to the positional accuracy of the localization of the speaker. If the confidence value is below a predetermined confidence threshold, meaning that the position of the speaker could not be determined with sufficient confidence, the localization detector may transmit a localization failure signal to the speech recognition system. In this case, the speech recognition system may be configured to output a "Repeat Command" prompt to the speaker to elicit another command from the speaker.

The system may further include a sensor, such as a daylight sensor, wherein the controller is configured to receive a sensor signal and control the actuator associated with the adjustable element according to the condition sensed by the sensor.

A method of adjusting an adjustable element associated with a vehicle is also provided. The method may include providing an array of microphones. The microphones may be used to detect speech emanating from a first person. The microphones produce voice signals corresponding to the detected speech. The method may further include determining the position of the first person based on the voice signals. The actuator of the adjustable element may be controlled in a manner that causes the adjustable element to move to a position appropriate for the determined position of the first person.

The method may include providing a speech recognition system adapted to recognize speech input commands issued by the first person. A determination may then be made as to which adjustable element among a plurality of adjustable elements is to be adjusted based on the received input command. When a speech recognition system is employed, beamforming the microphone signals detected by a microphone array may be beneficial. Beamformed microphone signals may be provided to the speech recognition system to improve the accuracy of the speech recognition system.

The method may further include calculating a confidence value relating the accuracy of the determination of the person's position. The confidence value may then be compared to a predefined confidence threshold. If it is determined that the calculated confidence value is below the predefined confidence threshold, a "repeat command" prompt may be issued.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3 is a flowchart illustrating a method of adjusting an adjustable element associated with a vehicle.

FIG. 4 is a flowchart illustrating another method of adjusting an adjustable element associated with a vehicle.

DETAILED DESCRIPTION OF THE PREFERRED EMBODIMENTS

A system for automatically adjusting adjustable vehicle elements is provided. For purposes of the present description the terms "vehicle", "vehicular cabin" and so forth may refer to watercraft, aircraft, automobiles, trucks or other transportation devices. Automobiles represent an especially attractive application of an automatic adjustment system and will form the basis of the description that follows. However, the systems and methods described below relating to the adjustment of vehicle elements associated with automobiles are readily adaptable to other vehicles and for adjusting vehicular elements other than those specifically described.

An adjustable element may include an interior mirror; an exterior mirror; a head rest; an arm rest; a steering wheel/steering column; a blower of a heating or air conditioning system; a display in an on-board navigation system; a loudspeaker; and the like.

As an example, interior and exterior mirrors may be adjusted according to the driver's position. Displays may be orientated to allow either the driver or the other passenger's optimal visibility of the screen. It may be preferred that all vehicle cabin elements are adjusted according to the driver's position/utterances, or that some elements such as audio playback devices, and the like may be adjusted according to the utterances of other passengers. The adjustable elements described herein may be standard components such as mirrors, windows, blower controls and so forth, as well as add-on or non-standard equipment such as on-board navigation systems, video/DVD players, televisions, audio entertainment systems, and the like.

Figure 1:
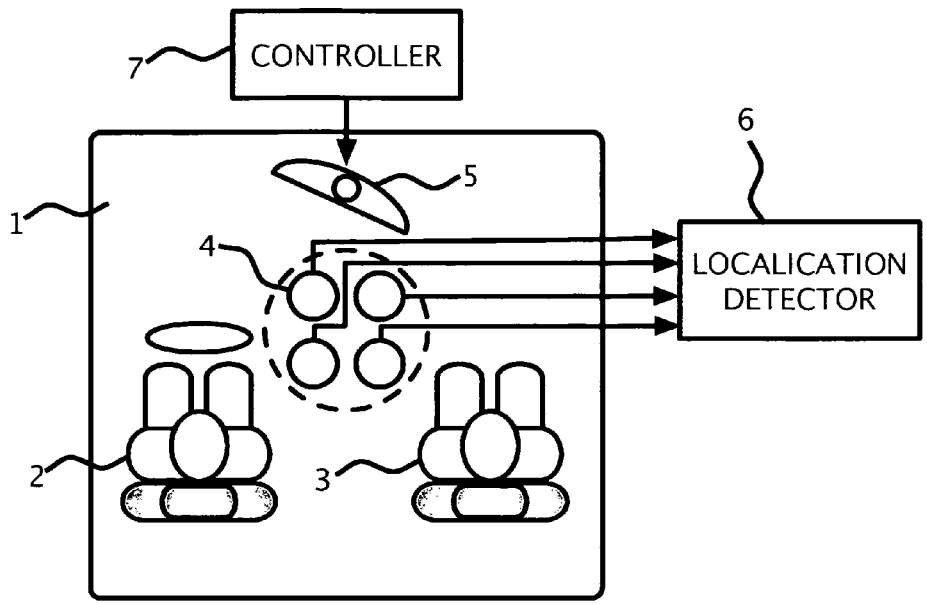
FIG. 1 shows the interior of a vehicle cabin including a system for automatically adjusting an adjustable element within the vehicle cabin.

The adjustable element may be equipped with an actuator such as a servo-motor, pneumatic valve, electrical solenoid or some actuator that cause the vehicular cabin element to move or change states according to control signals transmitted by a controller. FIG. 1 illustrates such a system. FIG. 1 shows a vehicle cabin 1, with a driver 2 and a passenger 3 seated in the vehicle cabin 1. An adjustable rear view mirror 5 is provided to allow the driver to view the scene behind the vehicle. The adjustable mirror 5 corresponds to an adjustable vehicle element that may be automatically adjusted by the present system. The system for automatically adjusting the position of the rear view mirror 5 may further include a microphone array 4, a localization or position detector 6, and a controller 7. The controller 7 may control the position of a small servo motor associated with the rear view mirror 5 to adjust the position and viewing angle of the mirror.

Consider the driver 2 piloting the vehicle in an urban setting. The driver must be alert to the many obstacles and hazards inherent in driving through crowded city streets. In such a situation, the driver 2 may want to position the driver's seat in a way that affords the driver maximum visibility and facilitates maintaining an alert posture. In these circumstances, the rear view mirror 5 may be adjusted to a first position to provide the optimal rear view viewing angle for the driver given the driver's height and the position and inclination of the driver's seat. Suppose the driver 2 and the passenger 3 intend to leave the city and embark on a long journey through the countryside. The driver 2 may decide to adjust the driver's seat to a more comfortable position more conducive to a long drive, or the driver 2 and the passenger may decide to switch roles, and the passenger assume driving responsibilities. In either case, the position of the rear mirror 5 may no longer be appropriate to provide the best rear view viewing angle given the new circumstances. The position of the rear view mirror may be re-adjusted to conform to the new conditions.

The microphone array 4 includes four individual microphones mounted between the driver 2 and the passenger 3. The microphones forming the array may be directional microphones, with the left two microphones directed toward the driver 2 and the right two microphones directed toward the passenger 3. This particular microphone arrangement is exemplary only. More or fewer microphones, additional microphone arrays, and microphones and microphone arrays placed elsewhere in the vehicle may also be employed without changing the system in any significant way. The microphone array may comprise one or more one-dimensional, two-dimensional or three-dimensional microphone assemblies, with one or more directional microphones pointing in different directions.

Usage of directional microphones may not only improve the localization of the speaker but may also support a possible identification of utterances by the driver in contrast to utterances by other passengers. One subset of directional microphones may be directed to the driver, and another to a front seat passenger in order to increase the reliability of the identification of an actual speaker, when various verbal commands are uttered.

The microphone array may include a frame wherein each microphone of the microphone array is arranged in a predetermined, fixed, position in or on the frame. This may ensure that after manufacture of the frame with the microphones, the relative positions of the microphones are known and remain fixed. Whereas one-dimensional (linear) microphone arrays can be easily installed at relatively low costs, two- and, in particular, three-dimensional arrays allow for a more accurate estimate of the direction and position of a speaker.

The individual microphones within the microphone array 4 may sense sounds within the vehicle cabin. The microphone signals may preferably be digitized and undergo a Fast Fourier Transformation for further processing. Methods for speaker localization using microphone arrays are known in the art (see, e.g., Microphone arrays: signal processing techniques and application, M. Brandstein and D. Ward, Springer, Berlin, 2001). Due to the directional nature of the microphones and their orientation within the microphone array 4, sounds emanating from different places in the cabin 1 will reach the various microphones at different times. Considering the constant speed of sound, the different sound travel times allow for a determination of the distance from the acoustic source to the respective microphones. As the driver 2 and passenger 3 converse with one another the sound of their voices may be detected by the microphones. Because the driver 2 and passenger are seated in two different locations, each microphone may detect their voices at different times. The voice signals detected by the microphone array are input to the localization detector 6. The localization detector 6 uses the differences in the sound transit times detected by the various microphones to accurately determine the position, or localize the sources of the sounds. In other words, the position of the driver 2 and of the passenger 3 can be determined based on the differences in the arrival time of their respective voices at the various microphones.

The localization detector 6 outputs a signal corresponding to the determined position of the driver. The localization detector output may be received by the controller 7. The controller 7 may control the position of the rear view mirror 5 based on the signal received from the localization detector. The controller 7 may activate the servo-motor associated with the rear view mirror 5 to reposition the mirror corresponding to the driver's location. The rear view mirror is repositioned so as to provide the optimal rear view viewing angle given the driver's position.

In addition to the servo-motor associated with the rear view mirror 5, the individual actuators of other vehicular cabin elements may also be controlled on the basis of localization signals that encode the position of the driver and possibly of other passengers. The optimized position or inclination of vehicular element for various localized positions of the driver and passengers may be stored in a memory. Actuation of the various elements may be performed using these stored data. Positional changes can be compensated for as needed. For example if the driver decides to move forward or backward while driving, the rear view mirror (and side view mirrors if necessary) can be automatically adjusted corresponding to the driver's new position. The new position may be calculated based on the verbal utterances of the driver after the driver changes positions.

Figure 2:
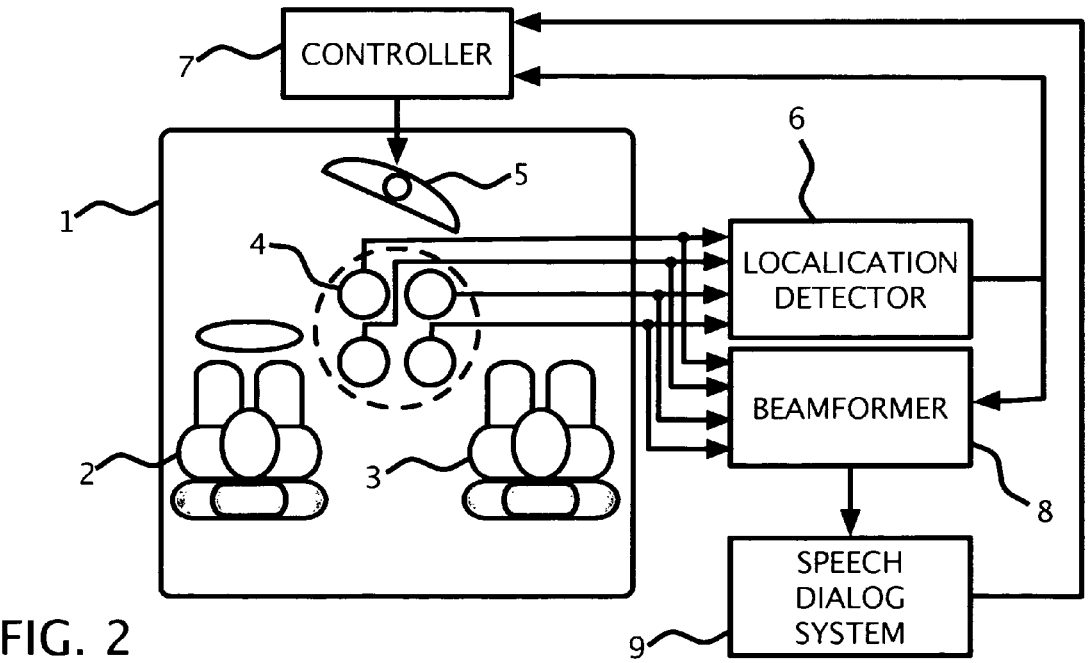
FIG. 2 shows the interior of a vehicle cabin including a system for automatically adjusting an adjustable element within the vehicle cabin, the system including a localization detector, a beamformer, and a speech dialog system.

FIG. 2 shows an enhanced version of a system for automatically adjusting one or more adjustable vehicle elements. As with FIG. 1 FIG. 2 shows a vehicle cabin 1, a driver 2, a passenger 3, and an adjustable rear view mirror 5. Again, the system for automatically adjusting the position of the rear view mirror 5 may include the microphone array 4, a localization or position detector 6, and a controller 7. The system shown in FIG. 2, however, also includes a beamformer 8 and a speech dialog system 9.

A "speech recognition system" may or may not include the ability to generate speech output such as voice prompts and the like, whereas a "speech dialog system" necessarily includes this ability. The speech dialog system 9 may be configured to receive the localization signal and to output the command signal on the basis of the localization signal. In this case, the controller 7 may additionally use the localization signal received from the localization detector to control the actuator and/or to crosscheck the commands given by the speech recognition system.

Whereas employment of a speech recognition system is not strictly necessary, it may be used to advantage in automatically adjusting vehicular cabin elements. For example, a driver who wants to have the blowers of the heating system re-directed toward or away from his present position, may simply utter "Blowers" or "Put blowers aside". The speech recognition system can be configured to map the associated microphone signals to the corresponding data representation and to transmit the appropriate command signals to the controller that subsequently re-directs the blowers utilizing the blower actuators.

The beamformer 8 may enhance the signal-to-noise ratio (SNR) significantly and thereby increases the reliability of the speech recognition system. In other words, the beamformer 8 may improve the probability that the correct data representation for the detected microphone signals is identified. The beamformer 8 may be an adaptive weighted sum beamformer that preferably combines time delayed complex-valued signals $X_{T,m}$ of M microphones pre-processed by a time delay means to obtain one output signal Y with an improved SNR according to the formula:

$$Y = \sum_{m=1}^{M} A_m X_{T,m}.$$

The weights $A_m$ may be time-independent or time-dependent. In the latter case, they may have to be recalculated repeatedly as required to maintain sensitivity in the desired direction and to minimize sensitivity in the directions of unwanted noise sources. The desired direction is determined by the localization means.

According to the enhanced system shown in FIG. 2, microphone signals obtained by the microphone array 4 may be used by the localization detector 6 to determine the position of, or localize a person speaking. In particular, the localization detector 6 may attempt to localize the driver 2 in order to properly position the rear view mirror relative to the driver's position. As was described with regard to FIG. 1, microphone array 4, the localization detector 6 and the controller all cooperate to determine the position of the driver 2 within the vehicle cabin 1 and to adjust the rear view mirror accordingly. The enhanced system of FIG. 2, however, is also capable of responding to voice commands, particularly voice commands issued by the driver 2.

In the enhanced system of FIG. 2, the microphone signals may be input to the beamformer 8 in addition to the localization detector. The beamformer 8 is an optional component that is intended to improve the performance of the speech dialog system 9. The beamformer 8 may receive signals output from the localization detector 6. The signals from the localization detector 6 enable the adjustment of the directional lobe of the beamformer 8 to allow the beamformer 8 to determine which utterances picked up by the microphone array 4 are associated with the driver 2. Thus, the beamformer 8 may provide voice signals to the speech dialog system 9 having a strong preference for speech signals originating from the driver 2. This improves the quality of the speech signals supplied to the speech dialog system 9, thereby increasing the reliability of the speech dialog system 9. Nonetheless, employing further noise reduction techniques may be advantageous.

According to the system shown in FIG. 2, the controller 7 may cause adjustment of the mirror 5 in response to either or both signals input from the localization detector 6 and the speech dialog system 9. As described with reference to FIG. 1, the localization means may detect some positional changes of the driver and may alert the controller 7 of the change in position. The servo-motor of the mirror 5 may be controlled by the controller 7 to adjust the mirror 5 to the new optimal inclination. Moreover, the driver 2 may use the speech dialog system 9 to have the mirror 5 be adjusted to a new position. For example, the driver may speak the command "Adjust interior mirror!" The associated speech signals are detected by the microphone array 4 and processed by the beamformer 8 before they are input to the speech dialog system 9. A speech recognizing means included in the speech dialog system 9 may map the signals to the appropriated data representation and, consequently, signals may be output to the controller 7 that cause the controller 7 to control the servo-motor associated with the rearview mirror 5 to adjust the mirror according to the localization information obtained by the localization means 6.

The localization means can be configured to evaluate the accurateness of the localization of the speaker and to transmit a localization failure signal to the speech recognition system if the position of the speaker cannot be satisfactorily determined. If the confidence level with which the speaker's position is determined is below a predetermined threshold, the speech recognition system can be configured to receive the failure signal and to output a "repeat command" prompt to the speaker.

For example, the driver may utter "Interior mirror" in order to readjust the interior mirror, but the localization means may not be able to accurately determine the driver's position. This may be caused by transient noise, e.g., a passing heavy truck or other noise. Test runs may be performed to determine the level of accuracy of speaker localization below which no satisfying adjustment of a particular vehicular cabin element is possible. For different vehicular cabin elements different levels may be determined.

If the localization means is not able to localize the speaker with satisfying accuracy, it may output a failure signal to the speech recognition system. The speech dialog system may then output the repeat command prompt. For example, the speech dialog system may ask the speaker to repeat his command by the synthesized utterance "Please repeat". When the driver again utters "Interior mirror" the localization means will again attempt to localize the speaker, possibly, with a better accuracy than before.

Furthermore, the system may comprise a sensor. In particular, the system may include a daylight sensor. The sensor may be configured to generate and transmit a sensor signal based on conditions sensed by the sensor. The control means may be configured to receive the sensor signal and control the actuator of the adjustable vehicular cabin element on the basis of the sensor signal. Changing weather conditions and progressing twilight may call for the adjustment of the interior mirror. An adjustment of vehicular cabin elements in response to both positional changes of the driver and exterior conditions can further improve comfort and safety.

The controller can be configured to adjust the vehicular cabin element by operating the actuator if a change in position of the speaker exceeds a predetermined level. The predetermined level may be chosen by the driver from a variety of levels offered by the system. Test runs may be performed to generate the different levels a driver may choose from. Thus, according to the individual preferences, automatic adjustment of vehicular cabin elements may be provided to further increase the driver's comfort.

A manual re-adjustment mechanism for re-adjustment of the vehicular cabin element by the speaker may also be provided. Such a feature is particularly helpful if the automatic adjustment does not work accurately, and/or if the speech recognition system cannot properly recognize the verbal utterances of the speaker due to, for example, excessive noise.

FIG. 3 is a flowchart illustrating one example of a method for adjusting an adjustable element associated with a vehicle, such as the rear view mirror as described above. According to the method illustrated in FIG. 3, a driver enters an automobile and starts the engine at 30, or by performing some similar initiation sequence such as partly turning the key in the starter lock, or some other sequence. In any case, once the driver has taken steps to initiate the sequence at 30, the driver may activate a speech dialog system at 31. The speech dialog system may be initiated, for example, by pressing an appropriate button on the vehicle's control panel, or the like. Before commencing the travel, the driver may determine that the rear view mirror is in need of adjustment. The driver may speak the command "Interior mirror" at 32. The driver's verbal command may be detected by a microphone array including multiple directional microphones such as those described above and the position of the driver is determined at 33 by the localization detector, again as described above. The speech dialog system may subsequently initiate adjustment of the rear view mirror at 34. The controller 7 may control the position of the servo-motor associated with the rear view mirror 5 in order to move the mirror to an appropriate position in dependence on the accurately determined position of the driver.

FIG. 4, shows a flowchart illustrating one example of an automatic process for adjusting the exterior left-hand-side and right-hand-side mirrors of an automobile using the speech dialog system shown in FIG. 2. The driver speaks the command "Adjust exterior mirrors" at 40. The speech dialog system may be able to successfully recognize the speech signals detected by the one or more microphone arrays, but the localization detector may fail to accurately determine the position of the driver, as shown at 41. This may be the result of high transient noise levels in the cabin, or the driver speaking the command too softly or some other reason that prevents the localization detector from accurately determining the position of the driver. In this case, the localization means may send a failure signal to the speech dialog system. The speech dialog system may be configured to respond to such a failure by outputting a "Repeat command" prompt at 42. The driver may repeat the command 43. On this occasion, the localization detector may succeed in accurately localizing the speaker at 44. The speech dialog system may cause a controller to adjust the exterior mirrors by servomotors according to the driver's position. After actuation of the exterior mirrors 45 has been completed, the speech dialog system may be in a stand-by mode. The driver may also have the interior mirror be re-adjusted and an utterance "Interior mirror" 46 can result in accurate adjustment of the interior mirror in a similar way as described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for adjusting an adjustable element associated with a vehicle, the system-comprising:
   an actuator adapted to adjust the adjustable element;
   at least one microphone array for detecting speech from a speaker within the vehicle and generating speech signals corresponding to the detected speech;
   a localization detector configured to determine a position of the speaker based on the speech signals and configured to output a localization signal that encodes the determined position of the speaker;

a speech recognition system configured to receive the speech signals and output a command signal based on content of the speech signals; and a controller for controlling the actuator, the controller adapted to receive the localization signal and the command signal and to control the actuator to adjust the state of the adjustable element on the basis of the determined position of the speaker encoded in the localization signal and the command signal, where the controller is configured to operate the actuator in response to a change in the position of the speaker being greater than a predetermined amount.

2. The system of claim 1, further comprising a beamformer configured to receive the speech signals and the localization signal, and to generate beamformed signals from the voice signals, where the beamformed signals exhibit a preference for voice signals in a direction determined by the localization signal, and where the speech recognition system is configured to receive the beamformed signals and output the command signal to the controller based on the beamformed signals.

3. The system of claim 2, where the localization detector is configured to calculate a confidence value relating to positional accuracy of localization of the speaker, and compare the confidence value to a predetermined confidence threshold such that the localization detector transmits a localization failure signal to the speech recognition system if the confidence value is below the predetermined confidence threshold.

4. The system of claim 3, where the speech recognition system is configured to output a repeat command prompt to the speaker when the speech recognition system receives a localization failure signal.

5. The system of claim 1, where the speech recognition system is configured to also receive the localization signal and to output the command signal based on the localization signal and the content of the speech signals.

6. The system of claim 1, further comprising a sensor, the controller being configured to receive a sensor output signal and to control the actuator associated with the adjustable element based on the received sensor output signal.

7. The system of claim 6, where the sensor comprises a daylight sensor.

8. The system of claim 1, further comprising a manual re-adjustment mechanism for re-adjusting the adjustable element by the speaker.

9. The system of claim 1, where the at least one microphone array includes at least one of a one-dimensional, two-dimensional, and three-dimensional assembly of microphones.

10. The system of claim 9, where the at least one microphone array includes a directional microphone.

11. The system of claim 9, where the at least one microphone array includes a plurality of directional microphones oriented in different directions.

12. The system of claim 1, where the adjustable element comprises at least one of an interior mirror; an exterior mirror; a head rest; an arm rest; a steering wheel/steering column; a heating/air conditioning blower; a display; an on-board navigation system; and a loudspeaker.

13. A method of adjusting an adjustable element associated with a vehicle, the adjustable element including an actuator for adjusting the adjustable element, the method comprising:

providing at least one microphone array;

detecting speech emanating from a first person by the at least one microphone array such that the at least one microphone array produces voice signals corresponding to the detected speech;

determining a position of the first person based on the voice signals;

encoding the determined position of the first person in a localization signal;

providing a speech recognition system adapted to recognize speech input commands uttered by the first person;

determining which adjustable element of a plurality of adjustable elements is to be adjusted based on the received input command; and controlling the actuator of the adjustable element to adjust the adjustable element to a position commensurate with the determined position of the first person encoded in the localization signal, the adjustable element adjusted in response to a change in the position of the first person being greater than a predetermined amount.

14. The method of claim 13, further comprising beamforming the microphone signals detected by the at least one microphone array and providing the beamformed microphone signals to the speech recognition system.

15. The method of claim 13, further comprising:

calculating a confidence value relating to accuracy of the determination of the position of the first person;

comparing the confidence value to a predefined confidence threshold; and generating a repeat command prompt when it is determined that the confidence value is below the predefined confidence threshold.

16. The method of claim 13, where the speech recognition system is adapted to receive localization information regarding the position of the person and to transmit the localization information to a controller that controls the actuator of the adjustable element to be adjusted.

17. The method of claim 13, where the actuator associated with the adjustable element is further controlled on the basis of data obtained by a sensor.

18. The method of claim 17, where the sensor is a daylight detecting sensor.

19. The method of claim 13, where the adjustable element is adapted to be manually re-adjusted.

20. The method of claim 13, where the position of the person is determined on a basis of microphone signals detected by the at least one microphone array comprising at least one of a one-dimensional, two-dimensional, or three-dimensional microphone array.

21. The method of claim 20, where the at least one microphone array includes a directional microphone.

22. The method of claim 20, where the at least one microphone array includes a plurality of directional microphones oriented in different directions.

23. The method of claim 13, where the adjustable element comprises at least one of: an interior mirror; an exterior mirror; a head rest; an arm rest; steering wheel/steering column; a heater/air conditioner blower; a display; an on-board navigation system; and a loudspeaker.

* * * * *